United States Patent [19]

Coles et al.

[11] Patent Number: 5,497,141
[45] Date of Patent: Mar. 5, 1996

[54] AUTOMATED LABOR ALERT AND REMOTE MESSAGING SYSTEM

[75] Inventors: Marshall R. Coles, Roswell; Robert P. Brooks, Cumming; Antony J. Castagno, Alpharetta, all of Ga.

[73] Assignee: Timecorp Systems, Inc., Atlanta, Ga.

[21] Appl. No.: 241,494

[22] Filed: May 12, 1994

[51] Int. Cl.⁶ .................................................. G08B 1/00
[52] U.S. Cl. ............... 340/309.15; 340/573; 340/825.32; 235/377; 346/80; 364/401; 368/12; 368/244
[58] Field of Search .................... 340/309.15, 825.31, 340/825.32, 825.34, 825.36, 573; 255/377; 346/80; 368/12, 244; 364/401, 424.04

[56] References Cited

U.S. PATENT DOCUMENTS

| | | | |
|---|---|---|---|
| 3,641,321 | 2/1972 | Tonne | 377/20 |
| 3,686,482 | 8/1972 | Gelder | 377/20 |
| 3,736,561 | 5/1973 | Rumpel | 340/825.22 |
| 3,778,809 | 12/1973 | Hawes | 340/309.5 |
| 4,331,953 | 5/1982 | Blevins et al. | 340/539 |
| 4,409,657 | 10/1983 | van der Lely | 364/401 |
| 4,506,274 | 3/1985 | Coe | 235/377 |
| 4,524,266 | 6/1985 | Krakauer et al. | 235/377 |
| 4,536,646 | 8/1985 | Adams et al. | 235/377 |
| 4,633,231 | 12/1986 | Kilian | 340/539 |
| 4,812,627 | 3/1989 | Wexler et al. | 235/377 |
| 4,906,972 | 3/1990 | Spencer | 342/502 |
| 4,937,599 | 6/1990 | Green | 235/377 |
| 4,994,908 | 2/1991 | Kuban et al. | 348/8 |
| 5,125,091 | 6/1992 | Staas, Jr. et al. | 395/650 |

*Primary Examiner*—John K. Peng
*Assistant Examiner*—Edward Lefkowitz
*Attorney, Agent, or Firm*—Jones & Askew

[57] ABSTRACT

An alert system for alerting a supervisor when an employee has worked beyond a predetermined time limit. The alert system comprises a time collection device that is interfaced with at least one alarm device. The time collection device is selectably operable to detect the input time when the employee clocks in and to generate an alert message when the employee works beyond the predetermined time limit. The predetermined time limit is set to a predetermined amount of time before a potential labor control violation, such as a violation of child labor laws or a violation of wage and hour laws, is about to occur. The time collection device comprises an input device interfaced with a controller which has the predetermined time limit stored in memory. The time collection device also includes a timer that is interfaced with the controller. The timer records the time that the employee clocks in and monitors the elapsed time after the input time. The alert system is operative to detect when the elapsed time exceeds the predetermined time limit and to send an alert signal from the controller to a selected alarm device.

35 Claims, 3 Drawing Sheets

Fig_2

AUTOMATED LABOR ALERT AND REMOTE MESSAGING SYSTEM

TECHNICAL FIELD

This invention relates generally to a labor alert system, and in particular to an employee time clock system for providing an alert message to a supervisor at a predetermined period of time before a potential labor control violation occurs.

BACKGROUND OF THE INVENTION

During the last century, labor control laws have had an unquestionable effect on the lives of every worker, both employers and employees. Labor control laws refer generally to all statutes, regulations, and rules relating to and regulating employers and employees, and include "wage and hour" laws which place strict regulations on an employee's wages and work hours. The most well known federal wage and hour laws, for example, set minimum wage requirements for all workers and set maximum hour limits on the amount of time an employee may work without receiving overtime pay. Other lesser known wage and hour laws set minimum time periods that must be allocated for breaks and meal periods throughout the day.

Recently, there has been increased attention directed towards the enforcement of labor control laws, particularly child labor laws. Child labor laws, which generally regulate and control the employment of minors, were originally implemented to curtail the oppressive employment of children in hazardous work environments, particularly in mines and factories, which was widespread at the time. Such extreme cases of child labor oppression are no longer prevalent, due in large part to the enactment of these laws. Nevertheless, the reach of child labor laws has expanded over the years and now extends into all areas of the country's work sector, including the retail, restaurant and fast food industries, which traditionally employ the largest concentrations of child labor.

The number of different child labor laws currently in existence, both on the national level and the local level, is overwhelming. Some of the laws are very general in nature, while others are much more specific and narrow in scope. The Federal Labor Standards Act, for example, includes child labor provisions which generally forbid any employer from employing any "oppressive child labor" in commerce. In addition, there are dozens of federal regulations enacted under this law that place very specific restrictions on child labor, including limitations on the hours that a minor may work.

In addition to the numerous federal statutes and regulations in the area, every state has adopted its own set of rules regulating child labor. Most of these local statutes and regulations are designed to supplement the federal regulations by placing additional restrictions on the employment of child labor, particularly on the hours that a minor may work.

As the enforcement of child labor laws has gained greater attention, the penalties assessed for violations of these laws have increased in severity. For example, the Federal Labor Standards Act assesses a fine of up to $1,000 for each violation. In addition, local labor boards assess their own fines which are often as much as $4,000 per violation per child. Furthermore, in some states, employers may be held criminally liable for violations of child labor laws, even in cases where the employee voluntarily works beyond the number of hours set by the labor statute. Typically these penalties are assessed regardless of the intent of the employer.

Because the employment of child labor is so highly regulated, it is often extremely difficult for employers to stay in compliance with the complicated maze of federal and local regulations. Child labor laws, for example, often provide different sets of rules depending on the particular age of the minor, e.g., 14 years old or less, between the ages of 14 and 16, and 16 years old or older. In addition, there are different restrictions placed on the number of hours that a minor may work on a particular day or in a week depending on whether the school at which the minor regularly attends is in session. One federal regulation, for example, provides that a minor between the ages of 14 and 16 may work only:

1. outside of school hours;
2. not more than 40 hours in any one week when school is not in session;
3. not more than 18 hours in any one week when school is in session;
4. not more than 8 hours in any one day when school is not in session;
5. not more than 3 hours in any one day when school is in session; and
6. between 7 a.m. and 7 p.m. in any one day, except during the summer, when the evening is extended until 9 p.m.

Adding to the complexity is the fact that it is not uncommon for local child labor laws to overlap with federal regulations by providing slightly different restrictions on child labor. For example, one Georgia law currently provides that a minor under 16 years of age is not permitted to work between the hours of 9 p.m. and 6 a.m.. Another statute forbids a minor under the age of 16 from working for more than four hours on any day in which school is in session, for more than eight hours on days other than school days, or for more than 40 hours in any one week.

It will thus be appreciated that it is a tremendous burden for employers to stay in compliance with child labor regulations. Each employer must keep abreast of not only federal rules and regulations in the area, but also of the local regulations in each state in which that employer employs a minor. Thus the burden is particularly great for large employers, for example in the retail, restaurant or fast food industries, in which it is not uncommon to employ minors in several, if not all fifty, states.

Unfortunately, even those employers that make an effort to remain up-to-date with applicable child labor regulations often will often unwittingly allow child labor violations to occur. In contrast to the early part of the century when the majority of child labor violations involved the deliberate exploitation of children as a cheap labor source in hazardous work environments, the most common child labor violations today occur when an employer inadvertently schedules or allows a minor employee to work beyond the maximum number of hours set by statute. Often a child labor violation will occur despite the employer having scheduled all of its minor employers in accordance with applicable rules and regulations. Typically these violations occur when an employee inadvertently, or perhaps voluntarily, works beyond his or her scheduled number of hours.

For example, an employer, when preparing its weekly work schedules, may appropriately schedule one of its minor employees to work a four hour shift on a particular school day, realizing that the applicable child labor laws allow a minor to work a maximum of four hours on school days. Despite having scheduled the minor employee appropriately, there are a number of instances that may occur which may nonetheless place the employer in violation of a child labor regulation. For example, the employee may clock in a few minutes early or clock out a few minutes late, causing the employee to be on the clock for longer than the four hours permitted by statute. Often the employer will not even realize that a child labor violation has occurred until the employee time records are later reviewed by a labor control board.

The problem for employers is not limited to child labor violations. Employers are also at risk for unintentionally violating other labor control laws. For example, a federal wage and hour regulation provides that an employer must provide a lunch break of at least thirty minutes for an employee that works a full eight hour shift. Even though an employer may appropriately schedule a thirty minute lunch break in an employee's schedule, the employer may unknowingly violate this regulation. For example, an employee may regularly not take a full thirty minute lunch break despite being scheduled to do so. The employer's weekly time clock records would thus fail to reflect the thirty minute lunch break for that employee, as required by law, thereby placing the employer at risk of violating the labor control law.

Thus, it would be beneficial to employers to have a system that would monitor the number of hours that an employee works and provide an alert message to a supervisor before a labor control violation occurs. Currently, many employers utilize electronic time clock systems for clocking in and out of work and for keeping track of how long an employee has worked on any given day or week. Current electronic time clock systems, however, do not provide a mechanism for alerting an employer of a potential labor control violation, such as a child labor violation or a wage and hour law violation, before its occurrence.

Some conventional systems, for example as described in U.S. Pat. No. 4,633,627 to Kilian and U.S. Pat. No. 4,331,953 to Blevins et al., are designed to monitor the length of time that a person remains in a defined region. These systems include remote transmitters having internal timers which are carried by the person or persons to be monitored. Upon the expiration of a predetermined amount of time, the remote unit will transmit a signal to a central location.

None of these conventional systems, however, are suitable for use as an automated labor alert and remote messaging system, because none of them provide an interface with an employee time clock system in order to provide real-time monitoring of alarm events associated with the number of hours worked by employees. Furthermore, because these conventional systems require each person that is to be monitored to carry a remote transmitter, they are particularly unsuitable for large employers, in which potentially many hundreds or even thousands of employees would be required to be equipped with these remote devices, each having a separately initialized timer.

Thus there is a need for an automated alert system that monitors the scheduling and hours of employees for potential labor control violations, particularly child labor violations and wage and hour law violations, and automatically notifies employers of potential violations before they occur.

Furthermore, there is a need for an alert system that is interfaced with the time clock system utilized by the employer in order to allow for real-time monitoring of alarm events associated with the number of hours worked by employees or with time of day restrictions on work by certain classes of employees.

Furthermore, there is a need for an alert system that automatically notifies a supervisor of a potential labor control violation with sufficient time to prevent the violation from occurring, thereby saving the employer the substantial expenses that would otherwise be forthcoming in fines or other assessments.

SUMMARY OF THE INVENTION

Briefly described, the present invention provides an alert system for alerting a supervisor when an employee has worked beyond a predetermined time limit. The predetermined time limit is set to assure that appropriate action can be taken before a violation can occur. The alert system comprises a time collection device that is interfaced with at least one alarm device. The time collection device is selectably operable to detect the input time when the employee clocks in and to generate an alert message when the employee works beyond the predetermined time limit.

In one aspect of the invention, the predetermined time limit is set to a predetermined amount of time before a potential labor control violation, such as a child labor violation or a wage and hour law violation, is about to occur. The labor control violation may comprise, for example, a limit on the number of hours that an employee or a class of employees may work in a given day, or on the cumulative number of hours that an employee may work in a week. Alternatively, the labor control violation may comprise a minimum time that an employee must take for scheduled breaks or meals.

The time collection device comprises an input device interfaced with a controller which has the predetermined time limit stored in memory. The time collection device also includes a timer that is interfaced with the controller. The timer records the time that the employee clocks in and monitors the elapsed time after the input time. The alert system is operative to detect when the elapsed time exceeds the predetermined time limit and to send an alert signal from the controller to a selected alarm device.

In another aspect of the present invention, the alert system also includes a host computer which is interfaced with a plurality of time collection devices and the alarm devices. Upon detection by one of the time collection devices that an employee has worked beyond the predetermined time limit, the time collection device generates an alert message and transmits the alert message to the host computer. The host computer then relays the message to a selected alarm device.

DETAILED DESCRIPTION OF THE PREFERRED EMBODIMENTS

Figure 1:
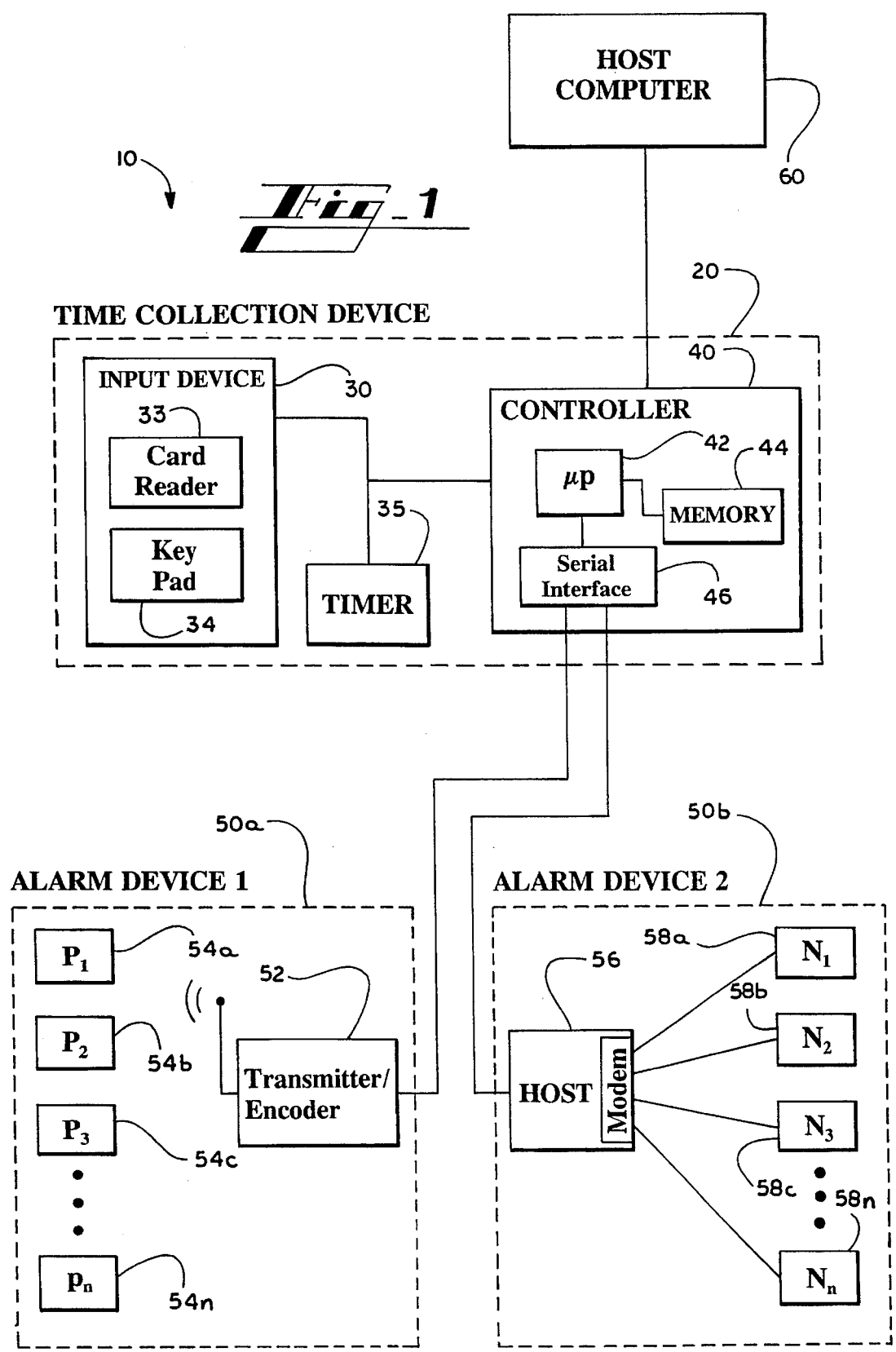
FIG. 1 is a block diagram that illustrates the physical configuration of a first preferred embodiment of the present invention.

Turning now to the drawing figures in which like numbers reference like parts or steps, the preferred embodiments of the present invention will now be described. FIG. 1 is a block diagram illustrating the physical configuration of a first preferred embodiment of an alert system 10. Time collection device 20 is selectably operable to collect input as employees clock in and out of work at the beginning and end of their work shifts and breaks throughout the day. Time collection device 20 comprises an input device 30 that is interfaced with a conventional timer 35 and a controller 40.

The input device 30 preferably comprises any one of the various conventional types of card readers 32 such as an integrated IATA Track 1/ABA Track 2 magnetic stripe or bar code reader or an external laser, wand, or projection beam scanner. The card reader 32 is used to receive and decode conventional employee identification cards. The input device 30 may also comprise a key pad 33 either as a substitute for or in addition to the card reader 32. The key pad 33 is used to set and adjust the timer 35 and is preferably integral to the time collection device 20.

The timer 35 is operable to record the input time at which an employee clocks in and to thereafter detect the time that elapses until the employee clocks out. The timer 35 includes a real-time clock and therefore provides time of day information to controller 40. The operation and implementation of the timer 35 are well known to those skilled in the art.

The circuitry of the time collection device 20 is driven by controller 40, which includes a microprocessor 42. The microprocessor 42 operates in conjunction with a set of algorithms stored in memory 44 that perform the real-time monitoring for the alert system 10.

Although not shown in the figure, the time collection device 20 may also include a visual display such as a liquid crystal display (LCD) or an external video display monitor that displays prompts, responses, and messages.

In the preferred embodiment, time collection device 20 is any one of a variety of conventional C-programmable employee time clock devices which are well known in the art. Some time collection devices 20 suitable for use include a TIMECORP® Series 2000 Time Collection Terminal or a TIMECORP® Series 3000 Time and Data Collection Terminal, both manufactured for TIMECORP Systems, Inc. by Accu-Time Systems of Ellington, Conn. Other C-programmable time collection terminals suitable for use are available from Panasonic, VeriFone, Control Module, Inc. or Kronos, Inc.

For the TIMECORP® Series 2000 Time Collection Terminal, the microprocessor 42 comprises an INTEL 80C188 complementary metal oxide semiconductor (CMOS) integrated circuit chip and includes between 128 kB and 1 MB of non-volatile memory 44.

While the time collection device 20 in the preferred embodiment comprises a programmable employee time clock device, it will readily be apparent to those skilled in the art that other devices could also be used. For example, the time collection device 20 may comprise a general purpose programmable digital computer such as an IBM PS/2, XT, AT or PC, or other compatible computing machine. The time collection device 20 may also comprise conventional Point of Sale (POS) equipment which is widely used in the retail industry as a connection to a network node. The POS terminals are provided with swipe card readers or other similar devices to allow employees to clock in. In addition, any one time collection device 20 may be linked to other time collection devices, network nodes, or computer applications.

Furthermore, while FIG. 1 illustrates the time collection device 20 as a single integrated unit, it will be readily apparent to those skilled in the art that the components of the time collection device 20 may reside in separate physical locations as long as they remain in communications with one another so as not to detract from the functionality of the device.

Interfaced with time collection device 20 via a standard RS-232-C serial interface 46 are alarm devices 50a and 50b which are operative to alert third parties of alarm conditions associated with the time that an employee is on the clock. Alarm devices 50a and 50b are two alternative implementations of alarm devices supported by the alert system 10. The first alarm device 50a comprises a conventional transmitter/encoder 52 which serves as a central base for paging communications with a plurality of conventional addressable paging devices 54a–54n. In the preferred embodiment, the paging devices 54a–54n are in the possession of selected personnel, such as supervisors or managers. A warning or alert signal is thus transmitted to a particular supervisor or manager according to the address of his or her paging device 54.

In the preferred embodiment, the transmitter/encoder 52 of Alarm device 50a is a Motorola PEOPLE FINDER® PLUS on-site paging system with tone alert, voice and alphanumeric paging capability. The paging devices 54a–54n are preferably Motorola ADVISOR Message Receivers which provide audible, vibratory, and/or alphanumeric visual alerts. The transmitter/encoder 52 communicates with paging devices 54a–54n on a frequency range of 438–470 MHz.

The second alarm device 50b is an alternative wide area implementation of an alarm device that comprises a host computer 56 with a modem 57 that communicates with a plurality of network nodes 58a–58n utilizing industry standard protocols for packet communication, such as the telecator alphanumeric protocol ("TAP").

While FIG. 1 illustrates the specific use of paging devices and modems as alarm devices 50, it will be readily apparent to those skilled in the art that other alarm devices may also be suitable for use. For example, the alarm device 50 may comprise a visible alert device such as a standard warning light or an audible alert device such as a siren or bell. Alteratively, a conventional computer terminal could be used as an alarm device 50 by displaying the alert message on a screen or by relaying the alert message to other devices, such as printers or personal digital assistants such as the Apple Newton.

The alert system 10 may also include a host computer 60 that is interfaced with the time collection device 20. The host computer 60 is provided to interface the time collection device 20 with a wide variety of computers and operating systems. In the preferred embodiment, the host computer 60 is an IBM PS/2, XT, AT or PC, or other compatible computing machine operating under a DOS operating system. However, the alert system 10 also supports a variety of other computers and operating systems such as Microsoft Windows, OS/2, and UNIX. Additionally, the alert system 10 supports a wide range of database platforms such as CTREE, Oracle, Informix, Ingres, and DB2.

Database information and the control code necessary for the operation of the alert system 10 are downloaded from host computer 60 and stored in memory 44 of time collection device 20. Although not required, it is preferable to use host computer 60 to download on powering up of time collection device 20. The database information that is downloaded includes, but is not limited to, employee human resource data, pay rules, child labor rules, employee work schedules, and time and attendance data. Also included in the information downloaded from the host computer 60 are predetermined time limits associated with the child labor rules or other labor control criteria. For example, information such as the maximum number of hours that a minor may work on a school day, on a non-school day, in a school week, and in a non-school week, as well as information defining the minimum number of hours that must be scheduled for breaks and meals, is downloaded from the host 60 to the controller 40.

The host computer 60 may also function to facilitate the reporting of information collected by the time collection device 20. For example, an employer may wish to permanently store information collected by the time collection device 20 by writing the information to a disk or by sending the information to a printer. Alternatively, a local retailer may wish to communicate information collected by the time collection device 20 to another location such as a corporate headquarters facility. On a host computer 60 operating under a DOS operating system, the control functions necessary for these communications are implemented by a "terminate and stay resident" (TSR) control program which is resident on the host 60. A TSR program resides in the computer memory and is invoked only in response to certain types of interrupt signals. The operation and implementation of TSR programs are well documented and known to those skilled in the art.

The physical configuration of the alert system 10 shown in FIG. 1 is preferably used when a single time collection device 20 is utilized. When multiple time collection devices 20 are used, however, the particular configuration shown in FIG. 1 is not optimal because multiple time collection devices 20 may wind up sending information out to the alarm devices 50 causing synchronization difficulties.

Figure 2:
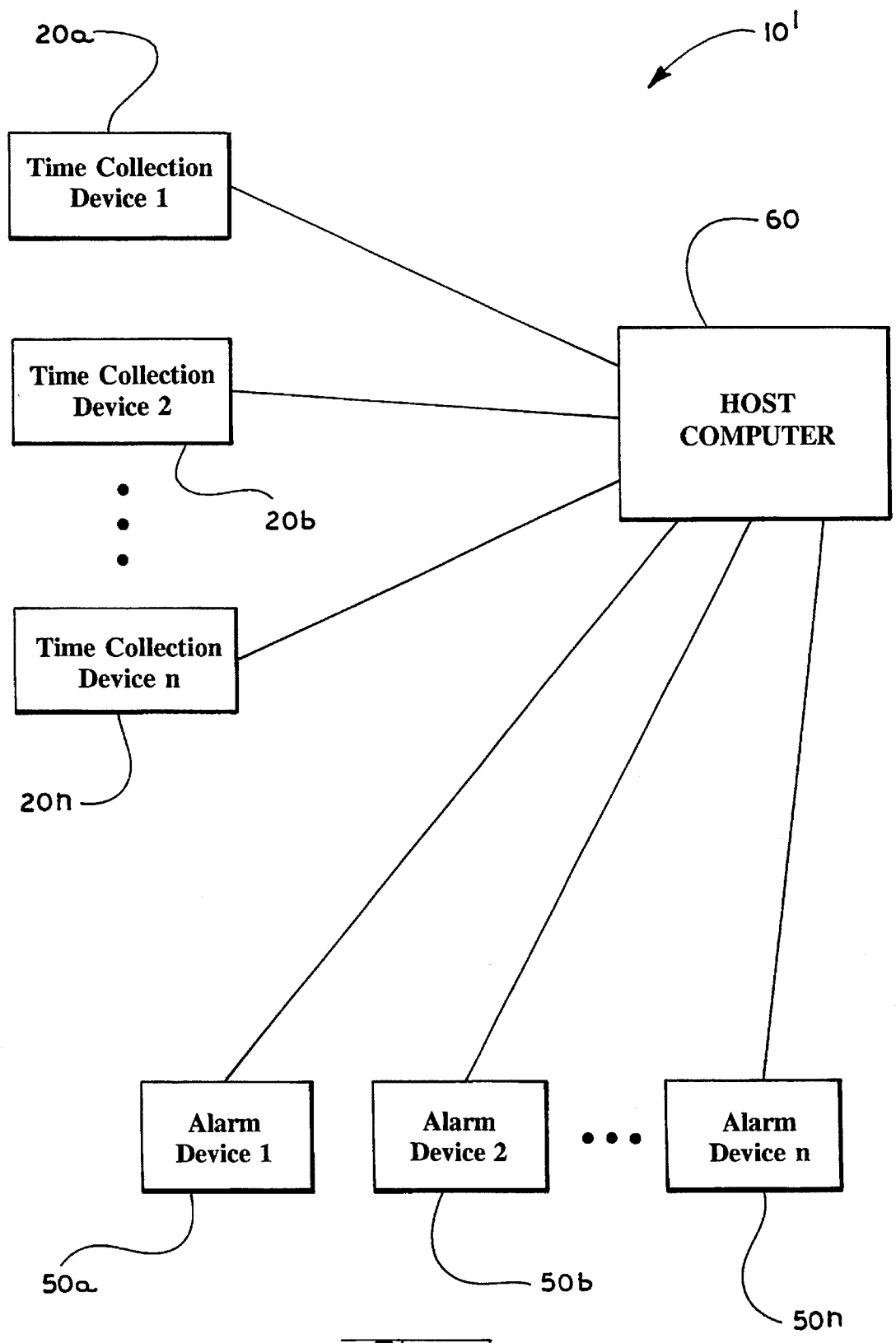
FIG. 2 is a block diagram that illustrates the physical configuration of a second preferred embodiment of the present invention.

FIG. 2, therefore, shows the physical configuration of an alternative embodiment of an alert system 10' for use in a multiple clock environment. In FIG. 2, host computer 60 is interfaced between a plurality of time collection devices 20a–20n and a plurality of alarm devices 50. Each time collection device 20a–20n is the same as the time collection device 20 shown in FIG. 1 except that alert messages generated by each time collection device 20a– 20n are sent to the host computer 60 instead of being sent directly to the alarm devices 50a–50n. In this configuration, the host computer 60 performs the added functionality of receiving the alert messages from the time collection devices 20 and transmitting or relaying the alerts to the appropriate alarm devices 50. This functionality is essentially a communications switching function and is implemented by a TSR process in a manner which is well known to those skilled in the art.

Generally described, the alert system 10 in either physical configuration operates in the following manner. Time collection device 20 is selectably operable to collect information associated with the clocking in and out of employees throughout the day. The information collected by the time collection device 20 includes an employee identification number and a time of either a clock in or a clock out. The time collection device 20 also monitors the elapsed time after the clock-in time. The elapsed time is continuously monitored against predetermined time limits which may be downloaded from the host computer 60 and which are stored in memory 44.

Upon the detection that the elapsed time has exceeded the predetermined time limit, the time collection device 20 generates an alert message and transmits the alert message to a predetermined alarm device 50. Depending on the physical configuration chosen, the time collection device 20 may transmit the alert message directly to the selected alarm device 50 or to a host computer 60 which will relay the message to the appropriate alarm device 50.

Figure 3:
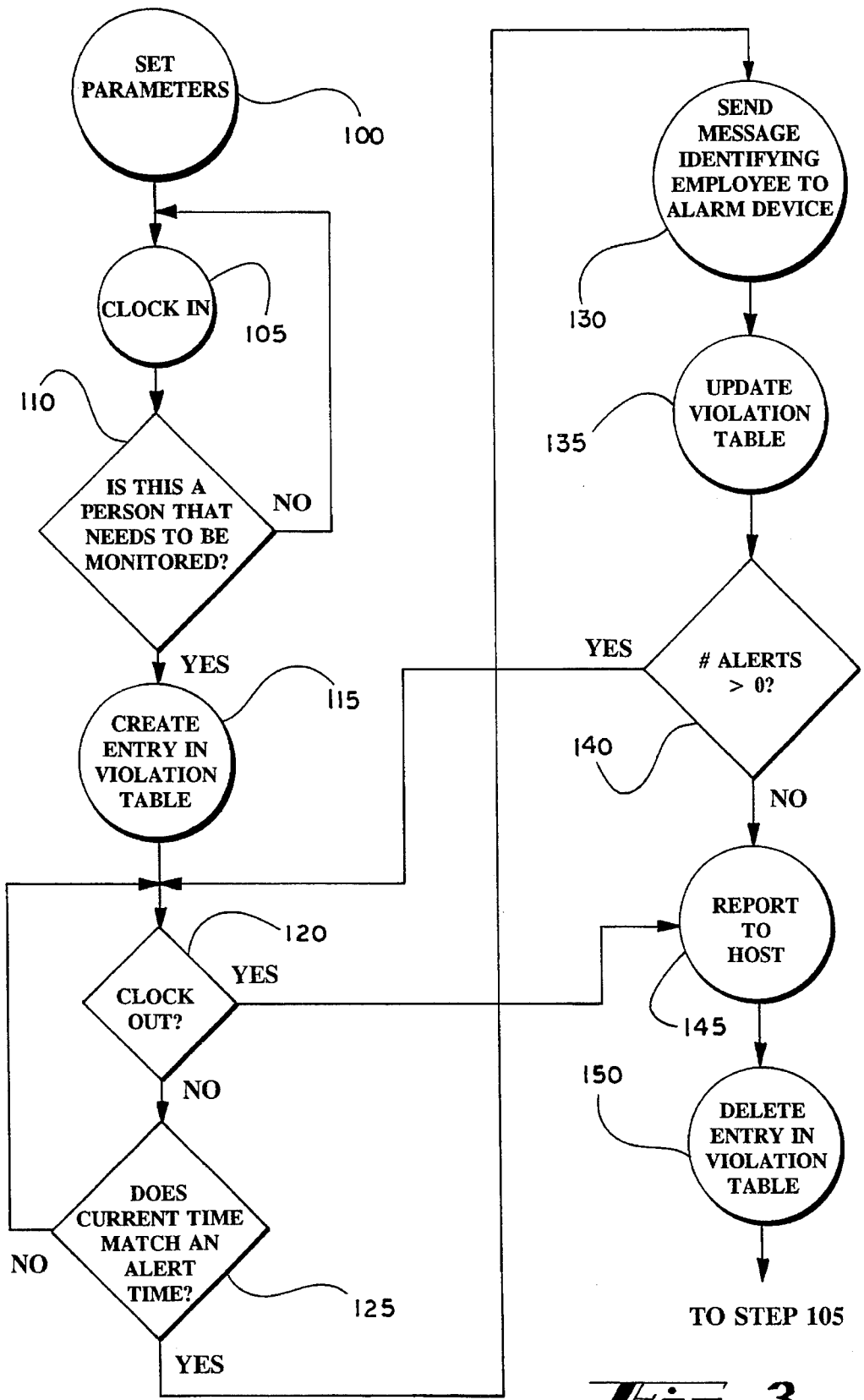
FIG. 3 is a flow chart showing the operation of both preferred embodiments of the present invention.

FIG. 3 is a flow chart illustrating the operation of the present invention as an alert system 10 for potential child labor violations. At step 100, several system parameters are set by the user at host computer 60. System parameters set by the user include the amount of time before a violation time to send a first alert and the number of alerts to send. In addition, the user may specify for each employee a particular paging device 54 or a number of paging devices to which the alert message should be transmitted if an alarm event is detected for that employee. Once set by the user, the system parameters are downloaded from the host 60 to the controller 40, and the alert system 10 is ready for operation.

At step 105, the alert system 10 continually monitors for a "clock in" at a time collection device 20. The "clock in" functions as an input of information to the time collection device 20, including the employee identification number and an input time, i.e., the "clock in" time.

After the employee clocks in, the system at step 110 first determines whether that employee is a person that needs to be monitored for a labor control violation. In the example discussed in connection with FIG. 3, an employee needs to be monitored if he or she is a minor employee.

While the alert system 10 in the preferred embodiment is utilized to detect child labor violations, it will be readily understood that the system may be used to detect other labor control violations by establishing different criteria for determining which employees need to be monitored. For example, certain employers may want to reduce their overtime costs by cutting down on the number of overtime hours worked by employees. In this circumstance, the alert system 10 may be used to monitor for impending overtime by keeping track of the cumulative time worked by employees and configuring the system to monitor all employees.

TABLE 1 illustrates an "employee table" that includes information associated with employees such as their name and employee identification number. The information included and shown in TABLE 1 is downloaded from host computer 60 and stored in memory of the controller 40.

TABLE 1

| NAME | EMPLOYEE ID NO. | MINOR | SUPERVISOR | ALARM DEVICE # |
|---|---|---|---|---|
| John Doe | 0001 | Y | 1001 | $P_1$ |
| Jane Smith | 0002 | Y | 1002 | $P_2$ |
| Jim Jones | 0003 | N | 1003 | $P_3$ |
| . | . | . | . | . |
| . | . | . | . | . |
| . | . | . | . | . |

Among the information included in TABLE 1 is a "flag" which indicates whether that employee needs to be monitored for possible labor control violations. As is well known and documented in the art, a "flag" is a marker that is used by a computer to signal the existence or status of a particular condition.

In the example discussed in connection with FIG. 3, the flag indicates whether a particular employee is a minor and is therefore subject to applicable child labor laws. The identification number of each employee's supervisor and the supervisor's associated alarm device number are also stored in the controller 40, thereby identifying the particular one of the addressable paging devices 54 to which alert messages associated with a particular employee should be sent.

Thus, based upon the employee identification number that is input at the time collection device 20, it can be determined whether that employee needs to be monitored for a potential labor control violation, in this case a child labor violation. If at step 110 it is determined that the employee clocking in is not a person that needs to be monitored for a potential child labor violation, i.e., is not a minor, then the process returns to step 105 to wait for another clock in.

If, on the other hand, the minor flag in the employee table is set for that employee, i.e., the employee is a minor, then the employee is a person that needs to be monitored for a possible child labor violation. At step 115 an entry in a "violations table" is created for that employee. The violations table temporarily stores entries or records of all employees that need to be monitored for possible labor control violations. TABLE 2 illustrates an example violations table and the information that may be stored therein.

of daily hours. A violation code '2' may define a violation of the maximum number of weekly hours. Again, the particular violation codes and associated specific labor control violations are provided for illustrative purposes, and it will be readily apparent to those skilled in the art that other violation codes and other specific labor control violations may also used.

The "number of alerts" shown in TABLE 2 refers to the number of alert signals to send as specified by the user in step 100. The number of alert signals, together with the amount of time before the violation time to send the first alert, determine the time that each subsequent alert message

TABLE 2

| EMPLOYEE ID NO. | ALERT TIME | VIOLATION TIME | VIOLATION CODE | ALERT CODE | NUMBER OF ALERTS | ALARM DEVICE NUMBER(S) |
|---|---|---|---|---|---|---|
| 0001 | 4:45 | 5:00 | 1 | 1 | 3 | $P_1$ |
| 0002 | 4:40 | 4:55 | 2 | 1 | 3 | $P_2, P_3$ |
| 0003 | 5:50 | 6:05 | 1 | 2 | 3 | $P_1$ |
| . | . | . | . | . | . | . |
| . | . | . | . | . | . | . |
| . | . | . | . | . | . | . |

The "violation time" shown in TABLE 2 refers to the actual time that the next labor control violation will occur. For example, the child labor rules which are stored in the controller 40 may specify that a minor employee may work for a maximum of 4 hours on a school day. If a minor employee clocks in at time collection device 20 at 4:00 p.m. on a school day, then the "violation time" for that employee will be 8:00 p.m.

The "alert time" shown in TABLE 2 refers to the time that the first alert signal will be sent to an alarm device 50. Thus, the alert time is determined by the system parameters set by the user at step 100, namely the amount of time before the violation time to send the first alert. For example, if a violation time for an employee is 8:00 p.m. and the user has specified that the first alert signal should be sent 15 minutes before the violation time, then the alert time shown in the violations table for that employee would be 7:45 p.m.

The "alert code" shown in TABLE 2 defines one of a plurality of categories of labor control violations which may be monitored by the alert system 10. For example, in the preferred embodiment an alert code '1' may define a category of child labor violations, an alert code '2' may define a category of overtime labor violations, and an alert code '3' may define a category of schedule validation labor violations.

By schedule validation labor violations, it is meant any violations associated with the employee's work schedule, including time and attendance. For example, if an employee is scheduled to clock in at 12:00, then a schedule validation labor violation may be defined to occur if that employee is not clocked in at a predetermined time thereafter, say 10 minutes. The particular alert codes and associated categories of labor control violations are provided for illustrative purposes, and it will be readily apparent to those skilled in the art that other alert codes and other categories of labor control violations may also be used.

TABLE 2 also includes a "violations code", which defines one of a plurality of specific labor control violations within any one of the categories defined by the alert code. For an alert code '1' (child labor violations), for example, a violation code '1' may define a violation of the maximum number will be transmitted. For example, the user may specify that the first alert signal should be sent 15 minutes before a labor violation is about to occur (the "violation time"), and that three alert signals should be sent. With these parameters set, the time collection device would send a first alert signal 15 minutes before the violation time, a second alert signal 10 minutes before the violation time, and a third alert signal 5 minutes before the violation time.

The violations table shown in TABLE 2 also contains the particular alarm device or devices 50a–50n to which an alert signal will be transmitted upon detection of an alert condition. The particular device number corresponds to the parameters specified by the user at step 100. As indicated in the table, the alert message may be transmitted to a single alarm device or to a plurality of alarm device, depending on the parameters set by the system user.

The entries in the violations table shown in TABLE 2 are generally stored only as long as the employee is on the clock, or as long as the data contained in the entries is useful to the system user. Generally speaking, therefore, a violations table entry is created when an employee that needs to be monitored clocks in, and the entry is deleted when that employee clocks out. However, the system user may choose to retain the violation table entries after the employee clocks out in order to allow the data contained therein to be reported to the host 60 for purposes of recording or other processing.

While the minor employee is on the clock, the time collection device 20 at step 120 will continually monitor for a clock out by the employee. At any time that the employee clocks out, then, if desired, a report is made to the host 60 at step 145. After reporting to the host 60, the entry in the violations table for that employee is deleted, and the process returns to step 105 to monitor for another clock in.

During the time that the employee is clocked in, i.e., until the employee clocks out, the time collection device 20 at step 125 continually monitors to determine if an alert time has been reached. In particular, the time collection device 20 continually compares the current time as maintained in the timer 35 against all alert times in the violations table as shown in TABLE 2. The alert system 10 will thus remain in a loop condition until either the employee clocks out at step 120 or an alert time is reached at step 125.

If an alert time is reached at step 125, then an alert message is sent, directly or indirectly, to an alarm device 50 at step 130. The alert signal is sent to the particular alarm device(s) 50 that are specified in the violations table. Thus, depending on the system parameters set by the user at step 100, the alert signal may be sent to a particular supervisor or work area, or to any combination of all alarm devices.

After an alert message is transmitted to an alarm device 50, the information contained in the violations table is updated at step 135. To update the violations table, the alert times and the number of alerts are recalculated to reflect that a first alert message has been transmitted. For example, consider a hypothetical example of an employee JANE SMITH, employee id no. 0002 with the alert system 10 initially set with the system parameters shown in TABLE 3.

TABLE 3

| | |
|---|---|
| Violation Time: | 5:00 p.m. |
| Minutes Before Warning to Send First Alert | 15:00 minutes |
| Alert Time | 4:45 p.m. |
| Number of Alerts | 3 alerts |

According to the parameters shown in TABLE 3, a first alert signal will be communicated to a specified alarm device 50 at 4:45 p.m., and two additional alert signals will be sent thereafter, one at 4:50 p.m. and one at 4:55 p.m. Therefore, after the first alert signal is sent, the system parameters will be updated as shown in TABLE 4.

TABLE 4

| | |
|---|---|
| Violation Time: | 5:00 p.m. |
| Minutes Before Warning to Send First Alert | 15:00 minutes |
| Alert Time | 4:50 p.m. |
| Number of Alerts | 2 alerts. |

In particular, the alert time is recalculated to indicate that the next alert time is 4:50 p.m., and the number of alerts remaining to be sent is now two. The entry in violations table corresponding to this employee will thus be updated accordingly.

At step 140, the time collection device 20 determines if any more alerts should be sent. If the number of alerts remaining to be sent is greater than zero, then the process returns to step 120, and the time collection device 20 monitors for either a clock out or for the next alert time to be reached.

If, on the other hand, at step 140 no more alerts should be sent, then, if desired, a report is sent to the host at step 145. The entry in the violations table for that employee is deleted at step 150, and the process returns to step 105, at which the time collection device 20 monitors for a check in.

The particular alert message communicated to the alarm device 50 is not critical and may be modified according to the preferences of the user. In the preferred embodiment, the alert signal is in the form:

"<ALERT CODE> ALERT: <EMPLOYEE NAME> <EMP. ID> IS <X> MINUTES FROM VIOLATING <VIOLATION CODE>."

The parameters <alert code>, <employee name>, <emp. ID>, <x> and <violation code> correspond to the information stored in the violations table, an example of which is shown in TABLE 2. Thus, an illustrative alert signal may read:

"CHILD LABOR ALERT: JOHN DOE (0001) IS 5 MINUTES FROM VIOLATING MAXIMUM WEEKDAY HOURS."

The alert system 10 thus provides a mechanism for alerting supervisors a predetermined period of time before a labor control violation is about to occur. In the preferred embodiment, the alert system 10 is configured to monitor for child labor violations. However, it will be readily apparent to those skilled in the art that the alert system 10 as disclosed herein could also be used to provide alerts of other pending labor control violations. For example, the alert system 10 could be used to alert management of impending overtime, i.e., that an employee is approaching the maximum number of regular, or for schedule validation labor violations by alerting a supervisor if an employee does not clock in at the time that he or she is scheduled. The alert system 10 could also be used to provide an alert message if an employee attempts to clock back in after a break prior to a minimum time limit set for breaks or meals.

The present invention has been described in relation to particular embodiments which are intended in all respects to be illustrative rather than restrictive. Alterative embodiments will become apparent to those skilled in the art to which the present invention pertains without departing from its spirit and scope. Accordingly, the scope of the present invention is defined by the appended claims rather than the foregoing discussion.

What is claimed is:

1. An alarm system for alerting when an employee has worked beyond a predetermined time limit, said system comprising:

a time collection device including:

an input device for detecting an input time when the employee clocks in and, in response to the detection of said input time, for generating an input signal indicating the input time and an employee identification signal identifying the employee;

a controller interfaced with said input device, said controller including means for storing information relating to employees whose hours require monitoring, and means, responsive to the input signal for the employee if the employee is one whose hours require monitoring, for determining said predetermined time limit and storing said predetermined time limit in memory; and a timer interfaced with said controller for recording said input time and for detecting an elapsed time after said input time; and at least one alarm device interfaced with said controller, wherein when said elapsed time exceeds said predetermined time limit, an alert message is communicated from said time collection device to said at least one alarm device.

2. The alarm system of claim 1, wherein said at least one alarm device is physically interfaced with said time collection device, and wherein said alert message is communicated from said time collection device directly to said at least one alarm device.

3. The alarm system of claim 1, further comprising:

a host computer interfaced with said time collection device and said at least one alarm device.

4. The alarm system of claim 3, wherein said alert message is transmitted from said time collection device to said host computer to said at least one alarm device.

5. The alarm system of claim 1, wherein said time collection device comprises a programmable time clock.

6. The alarm system of claim 1, wherein said time collection device comprises a point of sale terminal.

7. The alarm system of claim 1, wherein said alert message is communicated from said time collection device to said at least one alarm device at a predetermined period of time before said elapsed time exceeds said predetermined time limit.

8. The alarm system of claim 1, wherein said alarm device comprises:

a transmitter interfaced with said controller; and at least one receiver located remotely from said transmitter, wherein said transmitter is operative to communicate said alert message to said at least one receiver.

9. The alarm system of claim 8, wherein said at least one receiver is an addressable unit, and wherein said transmitter is operative to communicate said alert message to a selected one of said at least one receiver.

10. The alarm system of claim 8, wherein said transmitter is a modem.

11. The alarm system of claim 8, wherein said receiver is a paging device.

12. The alarm system of claim 3, wherein said alarm device is a second host computer.

13. The alarm system of claim 1, further comprising:

a monitor interfaced with said controller for providing information associated with said alert message.

14. The alarm system of claim 13, wherein said information associated with said alert message comprises an identification of the employee.

15. An alarm system for alerting when an employee has worked beyond a predetermined time limit, said system comprising:

a plurality of time collection devices, each including:

an input device for detecting an input time when the employee clocks in and, in response to the detection of said input time, for generating an input signal indicating the input time and an employee identification signal identifying the employee;

a controller interfaced with said input device, said controller including means for storing information relating to employees whose hours require monitoring, and means, responsive to the input signal for the employee if the employee is one whose hours require monitoring, for determining said predetermined time limit and storing said predetermined time limit in memory; and a timer interfaced with said controller for recording said input time and for detecting an elapsed time after said input time;

a host computer interfaced with said plurality of time collection devices;

at least one alarm device interfaced with said host computer, wherein when said elapsed time exceeds said predetermined time limit an alert message is communicated from one of said plurality of time collection devices to said host computer to said at least one alarm device.

16. The alarm system of claim 15, wherein said time collection device comprises a programmable time clock.

17. The alarm system of claim 15, wherein said time collection device comprises a point of sale terminal.

18. The alarm system of claim 15, wherein said alert message is communicated from said time collection device to said at least one alarm device at a predetermined period of time before said elapsed time exceeds said predetermined time limit.

19. The alarm system of claim 15, wherein said alarm device comprises:

a transmitter interfaced with said controller; and at least one receiver located remotely from said transmitter, wherein said transmitter is operative to communicate said alert message to said at least one receiver.

20. The alarm system of claim 19, wherein said at least one receiver is an addressable unit, and wherein said transmitter is operative to communicate said alert message to a selected one of said at least one receiver.

21. The alarm system of claim 19, wherein said transmitter is a modem.

22. The alarm system of claim 19, wherein said receiver is a paging device.

23. The alarm system of claim 15, wherein said alarm device is a second host computer.

24. The alarm system of claim 15, further comprising:

a monitor interfaced with said controller for providing information associated with said alert message.

25. The alarm system of claim 24, wherein said information associated with said alert message comprises an identification of the employee.

26. An alarm system for alerting an employer of a potential child labor violation occurring when a minor employee works beyond a predetermined time limit, said system comprising:

a time collection device including:

an input device for detecting an input time when the employee clocks in and, in response to the detection of said input time, for generating an input signal indicating the input time and an employee identification signal identifying the employee;

a controller interfaced with said input device, said controller including means for storing information relating to the minor employee, and means, responsive to the input signal for the minor employee, for determining said predetermined time limit and storing said predetermined time limit in memory; and a timer interfaced with said controller for recording said input time and for detecting an elapsed time after said input time; and a plurality of addressable alarm devices interfaced with said controller, wherein at a predetermined time before said elapsed time exceeds said predetermined time limit an alert message is communicated from said time collection device to selected ones of said plurality of addressable alarm devices.

27. The alarm system of claim 26, wherein said time collection device comprises a programmable time clock.

28. The alarm system of claim 26, wherein said time collection device comprises a point of sale terminal.

29. The alarm system of claim 26, wherein each of said plurality of alarm devices comprises:

a transmitter interfaced with said controller; and at least one receiver located remotely from said transmitter, wherein said transmitter is operative to communicate said alert message to said at least one receiver.

30. The alarm system of claim 29, wherein said at least one receiver is an addressable unit, and wherein said transmitter is operative to communicate said alert message to a selected one of said at least one receiver.

31. The alarm system of claim 29, wherein said transmitter is a modem.

32. The alarm system of claim 29, wherein said receiver is a paging device.

33. The alarm system of claim 26, wherein said alarm device is a host computer.

34. The alarm system of claim 26, further comprising:

a monitor interfaced with said controller for providing information associated with said alert message.

35. The alarm system of claim 34, wherein said information associated with said alert message comprises an identification of the employee.

* * * * *